F. DOW.
PIPE COUPLING.
APPLICATION FILED APR. 7, 1919.
1,352,118. Patented Sept. 7, 1920.
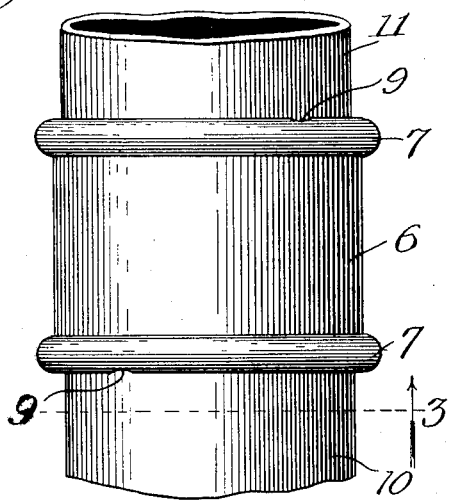
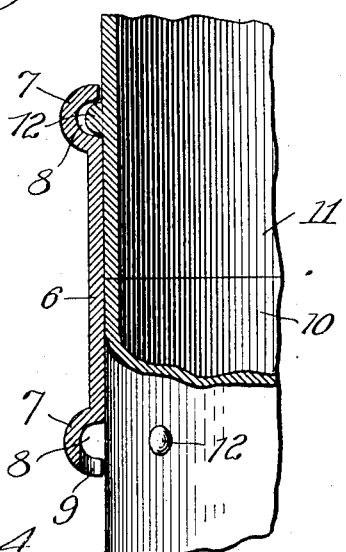
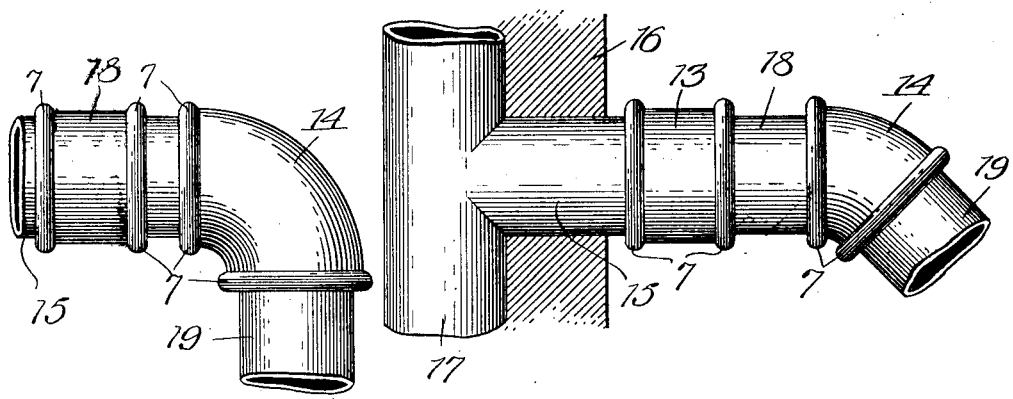
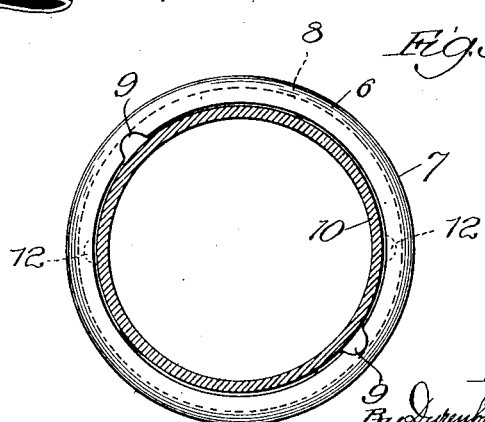
Witnesses:
D. S. Gaylord,
A. Kovarik.
Inventor:
Floyd Dow,
By Dyrenforth, Lee, Chritton & Wiles,
Attys.

UNITED STATES PATENT OFFICE.

FLOYD DOW, OF WYANET, ILLINOIS, ASSIGNOR OF ONE-HALF TO LLEWELLYN D. EDMINSTER, OF WYANET, ILLINOIS.

PIPE-COUPLING.

1,352,118.   Specification of Letters Patent.   Patented Sept. 7, 1920.

Application filed April 7, 1919. Serial No. 287,991.

*To all whom it may concern:*

Be it known that I, FLOYD DOW, a citizen of the United States, residing at Wyanet, in the county of Bureau and State of Illinois, have invented a new and useful Improvement in Pipe-Couplings, of which the following is a specification.

My invention relates, more particularly, to the coupling together of pipe-sections in such a way that while the sections thereof may be rotated relative to each other at will, they will be held against accidental separation, and more especially to pipe-sections wherein the joints between them involve the internal grooving of one section for receiving, and interfitting with, projections on the adjacent section.

My invention has particular use in connection with cast-metal pipe wherein it is very impracticable from a commercial standpoint to cast on the end of such a pipe, unless the pipe be relatively short, a bell, or flange-portion, with an internal groove for receiving the stud-equipped end of a pipe for connection therewith and insertible into this bell-portion, though it is applicable to pipes other than those made of cast-metal.

My primary object is to provide a coupling which will permit of the joining together of pipe-sections of any desired length in such a way that these sections may be readily put together and disconnected as desired, and permit of the relative rotatable adjustment of these sections at will.

A further object is to accomplish the foregoing by a relatively economical construction and one which may be furnished as straight sections, elbows or angle-sections.

Referring to the accompanying drawing, Figure 1 is a view in elevation of my improved pipe-coupling showing it as coupling together two adjacent alining sections of pipe. Fig. 2 is a broken, partially sectional view of the structure of Fig. 1. Fig. 3 is a section taken at the line 3 on Fig. 1 and viewed in the direction of the arrow. Fig. 4 is a broken view showing my improved coupling in straight and angle forms for connecting pipe-sections with a stack, through a branch pipe extending through the wall of a building shown in section; and Fig. 5, a view in elevation of a pipe structure employing a straight coupling and an elbow-coupling in accordance with my invention.

Referring more particularly to Figs. 1, 2, and 3, my improved coupling is represented at 6, this coupling which, by preference, is cast from metal and is provided of a relatively short length, being provided at its opposite ends with bell-sections 7 containing annular, circumferential, grooves 8 on their inner surfaces, with notches 9 opening from these grooves 8 through the ends of the coupling as represented, the notches 9 being spaced apart around the coupling to correspond with the spacing of the studs on the pipe-sections hereinafter referred to.

The coupling thus provided, and which may be straight as shown in the figures now being described, or of angle, or elbow, form, as shown in the figures to be described, coöperates with, and forms a coupling for, the pipe-sections proper, as, for example, those indicated at 10 and 11, these pipe-sections extending into the opposite ends of the coupling and being provided with studs 12, which may be cast on the pipes as shown, or provided as separate parts secured to the pipes, or where the character of the metal of which the pipes are formed will permit, struck up from the metal. The studs 12 at each end of the pipes 10 and 11, may be diametrically opposed as shown in Fig. 3, or off-set about the axis of the pipe, if desired, and in assembling the pipe-sections with my improved coupling the pipe-sections are rotatably adjusted relative to the coupling 6 to cause the studs 12 to aline with the notches 9, whereupon the coupler and pipe-sections are telescoped to enter the studs 12 into the grooves 8, and the pipe-sections and coupler 6 are then relatively rotated to cause the studs to be out of registration with the notches 9, thus securely holding the coupling and pipe-sections 10 and 11 in rotatably adjusted position, against separation longitudinally of these parts. In this arrangement, the adjacent ends of the pipe-sections 10 and 11, by preference, abut as shown in Fig. 2, when assembled with the coupling 6 and thus, especially where the pipe structure extends vertically, danger of water entering the joints between the coupler and pipe-sections and rusting or corroding them, is practically eliminated.

In Fig. 4, I have shown my invention embodied in two forms of couplings, the one represented at 13 being straight, and the other represented at 14 being a partial elbow, or an angle, both of these couplings being of the same construction as the coupling 6 and each affording at its opposite ends the internally grooved bell-portions 7. In this arrangement, the straight coupling 13 connects at one end with the stud-equipped end of a pipe-section 15 extending through a building wall represented at 16, and communicating with a vertical stack-pipe 17, and at its opposite end with one stud-equipped end of a straight pipe 18, the opposite end of the latter being connected with one end of the coupling 14. The opposite end of the coupling 14 connects with a stud-equipped end of a straight pipe 19, it being understood that each of the sections 18 and 19 are provided at both ends, in the arrangement shown, with the studs 12, as explained of the sections 10 and 11.

The arrangement shown in Fig. 5 is the same as that shown in Fig. 4, except that the coupling 14 is a 90° angle, or elbow, coupling instead of a 45° angle coupling. It will be manifest from the foregoing that by the use of my improved couplings the pipe-sections thereby connected together, may be provided in long lengths, each with the studs thereon at opposite ends for entering the grooves 8 of the couplings into which they are introduced and with which they become interlocked, but in such manner that the parts may be relatively rotated. Thus, I am enabled by an economical and highly practicable construction to provide the pipe-sections of long lengths and permit of the desired rotatable adjustment of the sections upon one another to adapt the sections of the pipe to be positioned at various angles to each other as conditions may require or render desirable.

Furthermore, by making both ends of the coupling of one construction and both ends of the pipe-sections of another construction, to interfit with the coupling, the number of stock parts required to be carried, especially where the studs are arranged otherwise than diametrically opposed where two studs are employed, or nonuniformly spaced apart where more than two studs are employed, is reduced to the minimum.

It will be understood that the invention is not limited to use with cast-pipe for stove-pipe, as it may be employed in pipes other than cast-pipe and for other than stove-pipe uses.

Various modifications and alterations may be made in the construction shown without departing from the spirit of my invention, it being my intention to claim my invention as fully and completely as the prior state of the art will permit.

What I claim as new and desire to secure by Letters Patent, is:

1. A coupling for pipe-sections formed on its inner surface at its opposite ends with circumferentially extending grooves extending at substantially 90° to the axis of the coupling and continuous or substantially continuous, with notches opening from said grooves through the ends of said coupling whereby said pipe sections and coupling are secured together and axial adjustment of the parts may be effected, for the purpose set forth.

2. A coupling for pipe-sections having at its opposite ends bell-sections containing circumferentially extending grooves on their inner surfaces extending at substantially 90° to the axis of the coupling and continuous or substantially continuous, with notches opening from said grooves through the ends of said coupling whereby said pipe sections and coupling are secured together and axial adjustment of the parts may be effected, for the purpose set forth.

3. A pipe-structure comprising a coupling formed on its inner surface at its opposite ends with circumferentially extending grooves extending at substantially 90° to the axis of the coupling and continuous or substantially continuous, with notches opening from said grooves through the ends of said coupling, and pipe-sections having studs spaced apart to correspond with the spacing of said notches, said pipe-sections extending into said coupling from the opposite ends thereof and substantially meeting at their adjacent ends, with the said studs extending into, and interlocking with, the said grooves at the opposite ends of the coupling, whereby said pipe sections and coupling are secured together and axial adjustment of the parts may be effected.

4. A pipe-structure comprising a coupling of cast-metal formed on its inner surface at its opposite ends with circumferentially extending grooves extending at substantially 90° to the axis of the coupling and continuous or substantially continuous, with notches opening from said grooves through the ends of said coupling, and cast pipe-sections having studs spaced apart to correspond with the spacing of said notches, said pipe-sections extending into said coupling at its opposite ends and substantially meeting at their adjacent ends, with the said studs extending into, and interlocking with, the said circumferential grooves at the opposite ends of the coupling.

FLOYD DOW.